United States Patent [19]

Iwaki et al.

[11] 3,781,633
[45] Dec. 25, 1973

[54] VEHICLE-CARRIED STORAGE BATTERY CHARGING DEVICE

[75] Inventors: Katsutaro Iwaki, Chiryu; Kazumasa Mori, Kariya; Masaru Ishihama; Yokio Kobayashi, both of Tokyo, all of Japan

[73] Assignee: Nippondenso Co., Ltd., Kariya-shi, Aichi-ken, Japan

[22] Filed: Sept. 14, 1971

[21] Appl. No.: 180,291

[30] Foreign Application Priority Data

Sept. 19, 1970 Japan.............................. 45/93496
Sept. 19, 1970 Japan.............................. 45/93497
Dec. 25, 1970 Japan.............................. 45/135297

[52] U.S. Cl..................... 320/48, 317/33, 320/64, 322/28, 322/99
[51] Int. Cl............................ H02j 7/14, H02j 7/24
[58] Field of Search........................ 320/48, 61, 64; 322/28, 99; 317/33

[56] References Cited
UNITED STATES PATENTS

| | | | |
|---|---|---|---|
| 3,624,482 | 11/1971 | Ruff.................................. | 322/99 X |
| 3,612,978 | 10/1971 | Mori.................................... | 322/99 |
| 3,492,559 | 1/1970 | Harris................................. | 322/99 X |
| 3,479,575 | 11/1969 | Wright et al...................... | 320/64 X |

*Primary Examiner*—J. D. Miller
*Assistant Examiner*—Robert J. Hickey
*Attorney*—Cushman et al.

[57] ABSTRACT

A vehicle carried storage battery charging device has been provided which supplies D.C. electrical power through a rectifier circuit from an A.C. generator. A voltage regulator including a voltage detecting circuit controls the setting time of the generator in response to a voltage detecting circuit. A pilot lamp circuit receives a supply of current and is controlled by a first transistor which is in turn gated by a second transistor governed by the output of the generator. A second voltage detector circuit responsive to the battery voltage supplies the base current to the first transistor when the battery voltage exceeds a certain amount and a diode coupled between the first transistor and the lamp circuit supplies base current to the first transistor when the power source is disconnected from the battery, said base current through the first transistor causing same to become conductive to therby light up the pilot lamp circuit so as to indicate a malfunction.

3 Claims, 3 Drawing Figures

INVENTORS
KATSUTARO IWAKI
KAZUMASA MORI
MASARU ISHIHAMA
YUKIO KOBAYASHI

BY
ATTORNEYS

VEHICLE-CARRIED STORAGE BATTERY CHARGING DEVICE

BACKGROUND OF THE INVENTION

1. Field of the Invention

This invention relates to a device for charging a storage battery carried by a vehicle, especially by an automobile.

2. Description of the Prior Art

Heretofore, there have been proposed charging devices for vehicles of the type that a storage battery is charged with a D.C. voltage obtained by rectifying the output A.C. voltage of an A.C. generator carried by a vehicle and there is provided a voltage regulator adapted to control the field current of the A.C. generator by detecting the voltage across the terminals of the storage battery.

However, such conventional devices are disadvantageous in that failure of the voltage regulator due to the breakdown of the transistors or the like makes it impossible to control the field current of the A.C. generator so that the storage battery tends to be overcharged.

Another problem with the prior-art devices described above is that if the voltage of the storage battery is not applied to the voltage regulator because the storage battery is reversely connected or the power source fuse is cut off for example, the current flowing through the field winding of the A.C. generator is interrupted so that the A.C. generator stops generating power but since the voltage of the storage battery is not applied to the pilot lamp switching transistor of the pilot lamp driving circuit, either, this transistor remains nonconductive so that the pilot lamp cannot be lit, thus failing to give a warning of charging failure.

SUMMARY OF THE INVENTION

It is an object of this invention to provide a vehicle-carried storage battery charging device wherein a storage battery is charged with a D.C. voltage obtained by rectifying the A.C. output voltage of an A.C. voltage and there is provided a voltage regulator adapted to control the field current of said A.C. generator by detecting the voltage across the terminals of the storage battery, comprising a first transistor for opening and closing a circuit for supplying a current to a charge pilot lamp, a second transistor adapted to operate permitting a base current to be supplied to said first transistor only when said A.C. generator is not generating power, a Zener diode for permitting a base current to be passed to said first transistor when the voltage across the terminals of said storage battery axceeds a predetermined level, and a diode for preventing a current flowing through said Zener diode from flowing through the collector and emitter of said second transistor.

According to the present invention, when the A.C. generator is not generating power, the first transistor is rendered conductive so that the pilot lamp is lit, whereas when the generator is generating power, the first transistor is rendered non-conductive so that the pilot lamp is extinguished, thus showing the condition that the storage battery is charged from the generator. Furthermore, if the field current of the A.C. generator cannot be controlled due to failure of the voltage regulator, then the storage battery is overcharged so that the voltage across the terminals thereof builds up; however, if the voltage described above exceeds a predetermined level, a base current is supplied to the first transistor through the Zener diode so that the first transistor is rendered conductive lighting the pilot lamp, thus warning of the overcharging of the storage battery.

According to the present invention, if the voltage of the storage battery is not applied to the voltage regulator because the power source fuse is cut off, then the current flowing through the field winding of the A.C. generator is interrupted so that the generator stops generating power, but in such a case a current flows from the pilot lamp into the base circuit of the transistor through the diode, whereby this transistor is rendered conductive so that the pilot lamp is turned on, thus warning of the failure of charging the storage battery.

DESCRIPTION OF THE PREFERRED EMBODIMENTS

Figure 1:
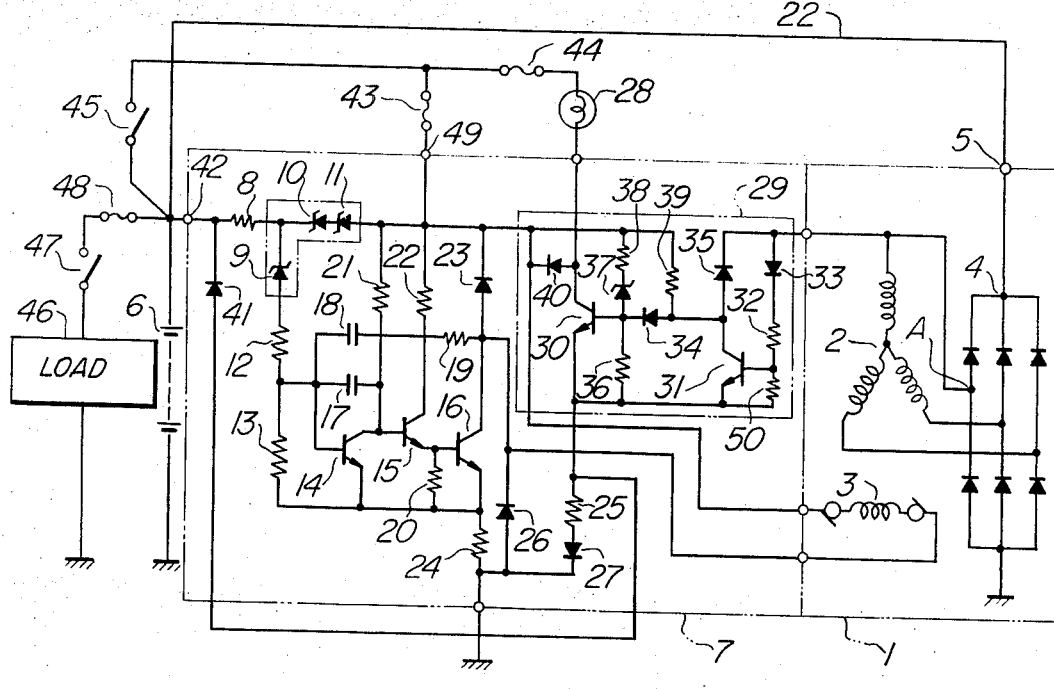
FIG. 1 is an electric circuit diagram showing the device for charging storage batteries carried by an automobile according to a first embodiment of the present invention.

Description will now be made of the first embodiment of the present invention shown in FIG. 1, wherein numeral 1 represents a field rotating type A.C. generator, 2 an armature winding thereof, and 3 a field winding. Numeral 4 denotes a full-wave rectifier circuit in which a terminal 5 on the positive side thereof is connected with the positive terminal of a vehicle-carried storage battery 6. Numeral 7 indicates a voltage regulator, 8 an input resistor, 9, 10 and 11 Zener diodes respectively, 12 and 13 biasing resistors respectively, 14, 15 and 16 switching transistors respectively, 17 a capacitor for absorbing noise pulses, 18 and 19 a feedback capacitor and resistor respectively, 20 a biasing resistor, 21 and 22 collector load resistors for transistors 14 and 15 respectively, 23 a flywheel diode, 24 and 25 first and second resistors each of which is adapted to serve also as fuse respectively, 26 and 27 diodes respectively, 28 a charge pilot lamp, 29 a circuit for energizing the charge pilot lamp, and 30 and 31 transistors respectively, the base of the transistor 31 being connected to a point A at one phase of the rectifier circuit 4. Numerals 34 and 35 indicate reverse-current blocking diodes respectively, 36 a biasing resistor, 37 a voltage detecting Zener diode, 38 and 39 resistors, and 40 a diode. Numeral 41 indicates a diode for absorbing a high voltage such as an ignition pulse or the like, and 42 a voltage detecting terminal. Numerals 43 and 44 denote power source fuses for the voltage regulator 7 respectively, 45 a key switch, 46 a load such as lamp, 47 a switch for turning on the power source, and 48 a fuse. Numeral 49 represents a power source side terminal, and 50 a resistor connected between the base and the emitter of the transistor 31.

Figure 2:
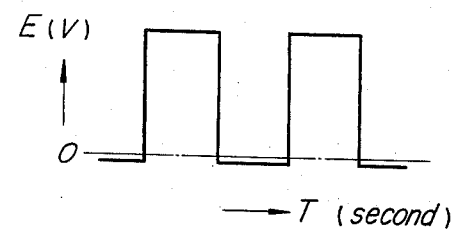
FIG. 2 is a view showing a waveform corresponding to one phase of a generator.

Description will now be made of the operation of the device having the aforementioned construction according to the present invention. The voltage regulator 7 is designed such that the terminal voltage of the storage battery 6 applied to the voltage detecting terminal 42 is detected by means of the Zener diode 9 and the transistors 14, 15 and 16 are made to perform switching operations so as to "on-off" control the current supplied to the field winding 3. Thus, the voltage produced by the A.C. generator 1 is controlled so that the voltage across the terminals of the storage battery 6 is controlled so as to be constant. In the pilot lamp driving circuit 29, such a rectangular wave voltage as shown in FIG. 2 appearing at the point A in one phase of the three-phase full-wave rectifier circuit 4 is applied to the base of the transistor 31, and while the storage battery 6 is being charged with a D.C. voltage obtained by smoothing the output voltage of the A.C. generator 1, the transistor 30 is rendered non-conductive so that the pilot lamp 28 is not energized. When the generator 1 is inoperative, a base current is permitted to flow through the transistor 30 through the resistor 39 and diode 34, with a result that the transistor 30 is rendered conductive so that the lamp 28 is turned on, thus giving a warning of abnormal conditions. In this case, if the voltage regulator 7 is at a high temperature, a leak current tends to be supplied from the resistor 39 to the base circuit of the transistor 31 through the diodes 33 and 35 due to variations in the characteristics of these diodes, but it is by-passed through the resistor 50, and thus the variations in the characteristics of the diodes 33, 35 are corrected so that the transistor 30 remains non-conductive. In this way, the transistor 30 continues conducting so as to prevent the lamp 28 from being turned off. If an ignition pulse including high frequency high voltage components available from the ignition device is applied to the voltage detecting terminal 42 of the voltage regulator 7, then there will be a great possibility that the resistor 8 at the input stage of the voltage regulator 7 is damaged, especially when the voltage regulator 7 is constructed in the form of an integrated circuit and therefore the diode 41 is not incorporated therein. With the device according to the present invention, the ignition pulse or the like imparted to the voltage detecting terminal 42 exceeds the backward voltage of the diode, and because of the capacitive characteristics of the diode 41, such pulse is by-passed to a circuit leading to the ground through the diode 41 and resistors 25 and 27 so as to be prevented from being imparted directly to the voltage regulator 7.

When lamp 28 is short-circuited, an excessive current flows through a closed circuit leading from the positive terminal of the storage battery 6 to the ground through the lamp 28, collector-emitter of the transistor 30 of the lamp energizing circuit 29, second resistor 25 serving also as fuse and diode 27, and such excessive current produces heat in the resistor 25 which in turn is thereby fused. Thus, the transistor 30 is prevented from being damaged, and also the other devices, especially the voltage regulator 7 is prevented from being damaged because of being burnt out as a result of the burning of the lead wires of the aforementioned closed circuit which may also lead to the occurrence of a fire in the vehicle.

If field winding 3 of the A.C. generator 1 is short-circuited, an excessive current flows through a closed circuit leading from the positive terminal of the storage battery 6 to the ground through the field winding 3, the collector-emitter of the transistor 16 constituting the voltage regulator 7 and the first resistor 24 serving also as a fuse, and such excessive current produces heat in the resistor 25 which in turn is thereby fused. Thus, the transistor 16 is prevented from being damaged, and also the other devices, especially the voltage regulator 7 is prevented from being damaged because of being burnt out as a result of the burning of the lead wires of the aforementioned closed circuit which may lead also to the occurrence of fire in the vehicle. At this point, the A.C. generator stops generating power, so that the transistor 30 of the lamp energizing circuit 29 is rendered conductive by being supplied with a base current through the resistor 39 and diode 34. As a result, the pilot lamp 28 is turned on, giving a warning of an abnormal condition occurring in the charging circuit.

Furthermore, when the voltage regulator 7 fails to control the charging of the storage battery 6 by the A.C. generator 1 because of the fact that the transistor 16 constituting the voltage regulator for example is so damaged by heat or the like as to lose its own function, the storage battery 6 tends to be overcharged; however, in such a case, if the voltage across the terminals of the storage battery exceeds the Zener voltage of the Zener diode 37, then a base current will be supplied to the transistor 30 through the diode 37 so that the transistor 30 is rendered conductive. Thus, the lamp 28 is turned on, giving a warning of over-charge. It will be readily appreciated in this case that despite the fact that the transistor 31 is rendered conductive, a current available from the Zener diode 37 is supplied to the base of the transistor 30 rather than to the transistor 31 because of the diode 34 so that the transistor 30 continues conducting, thus maintaining the lamp 28 turned on.

When the fuse 43 is cut off due to reverse connection of the storage battery 6 so that the fuse is subject to contact failure or the power source side terminal 49 of the voltage regulator 7 is disconnected, if the voltage of the storage battery is not applied to the voltage regulator 7, the exciting current flowing through the field winding 3 is interrupted with a result that the generator 1 stops producing power. In this case, a base current is supplied to the transistor 30 through the pilot lamp 28, diode 40, resistor 39 and diode 34 so that the transistor 30 is rendered conductive. Thus, the lamp 28 is lit, giving a warning of the abnormal condition occurring in the charging circuit.

Figure 3:
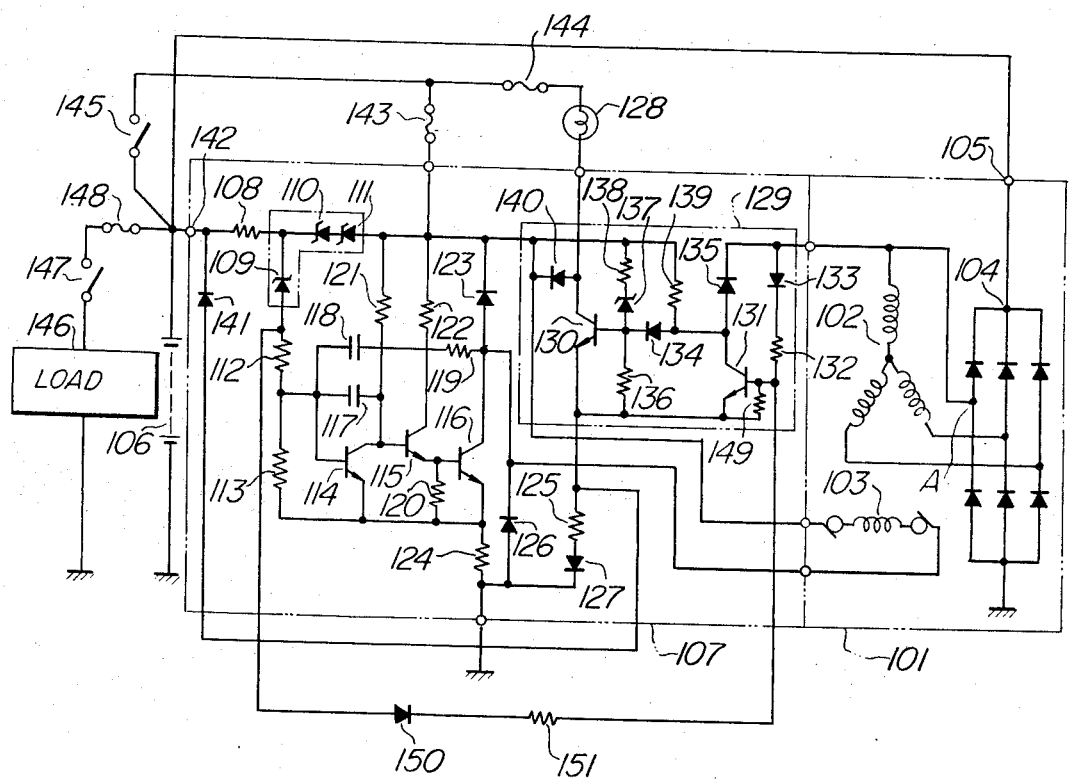
FIG. 3 is an electric circuit diagram showing the device for charging storage batteries carried by an automobile according to a second embodiment of the present invention.

Description will be made of the embodiment shown in FIG. 3, wherein numeral 101 represents a field rotating type A.C. generator carried by a vehicle, 102 an armature winding thereof, and 103 a field winding. Numeral 104 indicates a full-wave rectifier circuit having the positive terminal 105 thereof connected with the positive electrode of the storage battery. Numeral 107 denotes a voltage regulator, 108 an input resistor, 109 a Zener diode which is adapted to conduct when the terminal voltage of the storage battery 106 exceeds a standard voltage, 110 and 111 Zener diodes which are adapted to permit the voltage of the storage battery 106 to be imparted to the aforementioned voltage regulator 107 through a fuse 143 and these Zener diodes 110 and 111 when a terminal 142 is disconnected, respectively, 112 and 113 biasing resistors respectively, 114, 115 and 116 switching transistors, respectively, 117 a noise impulse absorbing capacitor, 118 and 119 feedback capacitor and resistor respectively, 120 a biasing resistor, 121 and 122 collector loads of the transistors 114 and 115 respectively, 123 a flywheel diode for absorbing any counter electromotive force that occurs in the field winding 103, 124 and 125 first and second resistors serving also as fuses respectively, 126 and 127 reverse-current blocking diodes respectively, 128 a pilot lamp, 129 a pilot lamp driving circuit, and 130 and 131 transistors connected in cascade with each other. The input side transistor 131 has its base connected to a point A in one phase of the rectifier circuit 104 through a resistor 132 and reverse-current blocking diode 133, and the output side transistor 130 has its collector-emitter circuit connected in series with the pilot lamp 128 for indicating the charging operation. Numerals 134 and 135 indicate reverse-current blocking diodes respectively, 136 a biasing resistor, 137 a voltage detecting Zener diode which is proviced for the purpose of permitting the transistor 130 to conduct so as to light the lamp 128, by virtue of an abnormal voltage, which occurs when the voltage regulator 7 is so damaged as to lose its controlling function. Numerals 138 and 139 represent resistors respectively, and 140 a reverse-current blocking diode. Numeral 141 denotes a diode adapted to absorb a high voltage such as ignition pulse or the like, and 142 a voltage detecting terminal. Numerals 143 and 144 indicate fuses respectively, 145 a key switch, 146 a load such as a lamp or the like, 147 a power source switch, and 148 a fuse. Numeral 149 shows a resistor connected between the base and the emitter of the transistor 131. Furthermore, the aforementioned transistor 130 has its base connected to the connection point between the Zener diode 109 and the resistor 112 through a reverse-current blocking diode 150 and current limiting resistor 151.

Next, description will be made of the operation of the device having the aforementioned construction according to the present invention. In the voltage regulator 107, the terminal voltage of the storage battery 106 applied to the voltage detecting terminal 142 is detected with the aid of the Zener diode 109, and the transistors 114, 115 and 116 are thereby switched so that the current flowing through the field winding 103 is controlled through the operation of the transistor 116. Thus, the terminal voltage of the storage battery 116 is controlled to be constant. In the pilot lamp driving circuit 129, the positive part of such a rectangular wave voltage as shown in FIG. 2 which occurs at the point A in one phase of the three-phase full-wave rectifier circuit 104 during the normal power generating operation of the armature winding 102 is applied to the base of the transistor 131 through the diode 133 and resistor 132 so that the transistor 131 is rendered conductive whereas the transistor 130 is rendered non-conductive so that the pilot lamp 128 is not lit. While the aforementioned rectangular wave voltage is negative, current flows from the storage battery 106 to the armature winding 102 through the key switch 145, fuse 143, resistor 139 and diode 135, whereas no current flows through the diode 134 and the base and emitter of the transistor 130 so that the transistor 130 is rendered non-conductive. Thus, the lamp 128 is extinguished since no current is supplied thereto. When the generator 101 is producing no electric power, on the other hand, a base current is passed to the transistor 130 through the resistor 139 and diode 134 so that the transistor 130 is rendered conductive. Thus, the pilot lamp 128 is lit, giving a warning of the abnormal condition. In this case, if the voltage regulator 107 is at a high temperature, a leak current tends to be passed from the resistor 139 to the base circuit of the transistor through the diodes 133 and 135 due to variations in the characteristics of these diodes, but such a current is by-passed through the resistor 149 so that the variations in the characteristics of the diodes 133 and 135 can be corrected, and thus the transistor 131 is prevented from conducting, while the transistor 130 continues conducting to maintain the lamp 128 lit. If the storage battery is overcharged, the Zener diode is rendered conductive so that the transistor 114 is turned on while the transistors 115 and 116 are turned off. Consequently, the current flowing through the field winding 103 is cut off so that the armature winding 102 stops producing power. In this case, however, a base current is passed to the transistor 131 through the diode 150 and resistor 151 so that the transistor 131 is rendered conductive while the transistor 130 is rendered non-conductive. Therefore, the pilot lamp 128 is not lit.

Although, in the foregoing, description has been made of the case where the base of the transistor 131 incorporated in the lamp driving circuit is connected with the output terminal of the storage battery 106 through the Zener diode 109 of the voltage regulator 107, it is also possible that the base of the aforementioned transistor 131 may be connected with the output terminal of the storage battery 106 through a Zener diode other than the Zener diode 109. Furthermore, the current limiting the resistor 151 is not essentially required; it may be omitted if desired.

As will be appreciated from what has been described above, with the device embodying the present invention, when the generator 101 stops producing power, a base current can be prevented from being passed to the transistor 131 of the pilot lamp driving circuit 129, so that the pilot lamp 128 can be lit with the transistor 131 rendered non-conductive and the transistor 130 rendered conductive. Furthermore, when the voltage regulator 107 is damaged or the voltage detecting terminal 142 is disconnected so that the voltage of the generator 101 becomes too high (above 18 V for example), the transistor 130 can be rendered conductive, and hence the pilot lamp 128 can be lit because of the conduction of the Zener diode 137. Accordingly, in case either the generator 101 or voltage regulator 107 does not operate normally, the pilot lamp 128 can be lit.

Still furthermore, in the device of this invention, since the base of the input side transistor 131 incorporated in the pilot lamp driving circuit 129 is connected with the output terminal of the storage battery 106 through the Zener diode, if such a special situation occurs that the generator 101 temporarily stops generating power due to the overcharge of the storage battery 106 or the like despite the fact that the generator and voltage regulator 107 are operating normally, the diode 150 operates to permit a base current to be passed to the transistor 131 so that the latter is rendered conductive while the transistor 130 is rendered non-conductive so as to maintain the pilot lamp non-lit.

We claim:

1. A vehicle-carried storage battery charging device for use in a storage battery, an A.C. generator, and a rectifier for supplying D.C. electrical power to the battery comprising:

voltage regulating means having a power source terminal connected to the battery, a first voltage detecting circuit, including a first Zener diode connnected to said power source terminal for detecting the voltage applied thereto; and means connected between said first voltage detecting circuit and the field winding of the generator for controlling the exciting current of said generator in response to the output of said first voltage detecting circuit;

a pilot lamp connected to said battery; a first transistor connected to said pilot lamp for controlling a current flowing through said pilot lamp;

a second transistor connected to said first transistor and to an armature winding of said generator for rendering said first transistor nonconductive when said generator charges said battery;

a second voltage detecting circuit including a second Zener diode and connected between said power source terminal of said voltage regulating means and said first transistor, for supplying a base current to said first transistor when the voltage across said battery exceeds a first predetermined value;

a first diode connected between the base circuit of said first transistor and said pilot lamp for supplying a base current to said first transistor through said pilot lamp when said power source terminal is disconnected from said battery; and a second diode connected between said first and second transistors for preventing the base current to said first transistor supplied by said second voltage detecting circuit from flowing to said second transistor.

2. A vehicle-carried storage battery charging device according to claim 1, further comprising:

a circuit, including a third diode and connected between said first voltage detecting circuit and said second transistor, for rendering said second transistor conductive to thereby turn off said first transistor when the voltage across said battery exceeds a second predetermined value and said voltage regulating means interrupts the exciting current of said generator.

3. A vehicle-carried storage battery charging device for use with a storage battery, an A.C. generator, a rectifier for supplying D.C. electric power to the battery comprising:

voltage regulating means having a power source terminal connected to the battery; a first voltage detecting circuit, including a first Zener diode and connected to said power source terminal, for detecting the voltage applied thereto; and means, connected between said first voltage detecting circuit and the field winding of the generator, for controlling the exciting current of said generator in response to the output of said first voltage detecting circuit;

a lamp circuit, including a pilot lamp and a current supplying circuit, for connecting said pilot lamp to said battery so as to supply said pilot lamp with a current therethrough;

a first transistor, connected to said lamp circuit, for controlling the current flowing through said current supplying circuit for said pilot lamp;

a second transistor, connected to said first transistor and to an armature winding of said generator, for rendering said first transistor nonconductive when said generator charges said battery; and a circuit, including a second diode and connected between said first voltage detecting circuit and said second transistor, for rendering said second transistor conductive to thereby turn off said first transistor when the voltage across said battery exceeds a predetermined value and said voltage regulating means interrupts the exciting current of said generator.

* * * * *